US United States Patent [19]

Lazear

[11] 4,346,142
[45] Aug. 24, 1982

[54] HYDROPHILIC MONOMER TREATED MICROPOROUS FILMS AND PROCESS

[75] Inventor: Nelson R. Lazear, New Martinsville, W. Va.

[73] Assignee: Celanese Corporation, New York, N.Y.

[21] Appl. No.: 206,975

[22] Filed: Nov. 14, 1980

Related U.S. Application Data

[63] Continuation of Ser. No. 71,644, Sep. 4, 1979, abandoned.

[51] Int. Cl.$^3$ .................................................. B05D 3/06
[52] U.S. Cl. .................................... 428/315.7; 427/44; 428/319.7; 428/341; 428/518; 428/520
[58] Field of Search ............ 427/44; 428/315.5, 319.7, 428/341, 518, 520, 315.7

[56] References Cited

U.S. PATENT DOCUMENTS

| | | | |
|---|---|---|---|
| 2,999,056 | 9/1961 | Tanner | 204/154 |
| 3,215,486 | 11/1965 | Hada et al. | 8/74 |
| 3,231,530 | 1/1966 | Prahl | 260/23 |
| 3,281,263 | 10/1966 | Priesing | 117/62 |
| 3,372,100 | 3/1968 | Charlesby et al. | 204/159.17 |
| 3,709,718 | 1/1973 | Schamberg et al. | 117/93.31 |
| 3,853,601 | 12/1974 | Taskier | 117/98 |
| 4,055,696 | 10/1977 | Kamada et al. | 428/398 |

FOREIGN PATENT DOCUMENTS 981991 1/1976 Canada .

*Primary Examiner*—Bernard D. Pianalto

[57] ABSTRACT

The present invention is directed to a process for rendering a normally hydrophobic polyolefinic open celled microporous film relatively permanently hydrophilic, improving the water flow rate therethrough, and reducing the electrical resistance thereof by chemically fixing a controlled amount of at least one hydrophilic organic hydrocarbon monomer to the surface of the micropores of the film with ionizing radiation. The amount of hydrophilic monomer which is chemically fixed to the surface of the micropores is controlled to avoid plugging of the pores subsequent to the radiation treatment.

15 Claims, No Drawings

HYDROPHILIC MONOMER TREATED MICROPOROUS FILMS AND PROCESS

This is a continuation, of application Ser. No. 71,644, filed Sept. 4, 1979, now abandoned.

BACKGROUND OF THE INVENTION

1. Field of the Invention

This invention relates to microporous film having improved water permeability and/or reduced electrical resistance.

2. Summary of the Prior Art

Recent developments in the area of open celled microporous polymeric films, exemplified by U.S. Pat. Nos. 3,839,516; 3,801,404; 3,679,538; 3,558,764; and 3,426,754, have instigated studies to discover applications which could exploit the unique properties of these new films. Such films which are in effect a gas-breathing water barrier can be used as vents, gas-liquid transfer mediums, battery separators and a variety of other uses.

One disadvantage of these films, which in the past has limited the number of applications to which they may be put, has been their hydrophobic nature. This is especially true when polyolefinic films, a preferred type of polymeric material often employed in the manufacture of microporous films, are employed. Because these films are not "wetted" with water and aqueous solutions they could not be used advantageously in such logical applications as filter media electrochemical separator components and the like.

Several proposals have been put forth in the past to overcome these problems such as exemplified by U.S. Pat. Nos. 3,853,601; 3,231,530; 3,215,486; and Canadian Pat. No. 981,991, which utilize a variety of hydrophilic coating agents or impregnants. Such coating agents or impregnants, although effective for a limited period of time, tend to be removed in a relatively short time by solutions which contact the films or fibers in which they are present.

Others have attempted to impart a hydrophilic character to a normally hydrophobic microporous film by the use of low energy plasma treatments. Such plasma treatments are achieved by first activating surface sites of the microporous film using argon or hydrogen plasma, and then grafting thereto an appropriate free radical polymerizing species, such as acrylic acid. The plasma treatments result in a film having only a surface which is re-wettable. The surface of the film also becomes plugged when wet which then inhibits or prevents the free flow of water through the interior of the film.

The unavoidable plugging of the surface pores renders the film unsuitable for certain filter applications, increases the electrical resistance of the film, and reduces the dimensional stability of the films as exhibited by substantial shrinkage on drying.

As stated above, a disadvantage of the plasma treatment is its limited ability to render only the surface of the microporous film wettable. It has been observed that due to the unusually large surface area of a microporous film of the type described herein, mere surface wettability does not insure that the film will exhibit certain functional properties such as low electrical resistance, and water flow rates through the film which are comparable to known surfactant systems discussed above.

The primary disadvantage of the plasma treatments, namely, pore plugging and mere surface wettability, are believed to result from a combination of factors, such as the tendency of the low energy plasma to be readily deactivated by the high surface area of the microporous film. This reduces the likelihood that an interior site within the microporous film will be activated. Similarly there is competition for incoming graftable monomers exerted by the free radial polymer grafts which are initially generated at the surface of the film when the graftable monomer first contacts the plasma activated microporous film surface. Thus, the graft polymer chains initially present on the film surface propagate at an increasingly faster rate as the reaction proceeds. Consequently, the resulting lengthened graft polymer chains which occur at the surface of the film entangle and plug the surface micropores in the presence of water.

Other attempts to provide hydrophilic films using a plasma treatment are illustrated by U.S. Pat. Nos. 3,992,495 and 4,046,843.

Another technique for rendering polyethylene films wettable and suitable for use in electrical battery separators is illustrated by V. D'Agostino an J. Lee, *Manufacturing Methods For High Performance Grafted-Polyethylene Battery Separators*, U.S. National Technical Information Service, A.D. Report No. 745,571 (1972) summarized in 78 Chemical Abstract 5031f (1973); V. D'Agostino and J. Lee, *Low Temperature Alkaline Battery Separators*, 27 Power Sources Symp. 87–91 (1976), summarized in 86 Chemical Abstract 158277f; 19 V. D'Agostino, J. Lee, and G. Orban, *Zinc-Silver Oxide Batteries*, (A. Fleischer and J. Lander ed, 1971).

Such articles discuss or relate to a commercial product known as PERMION TM developed by RAI Research Corp. Briefly, the method of preparation of this material consists of crosslinking a one mil polyethylene sheet using beta radiation, followed by grafting with methacrylic acid in an appropriate solution under Co60 gamma radiation. The grafted material is washed to remove the homopolymer, then converted to the salt form in hot KOH, washed again to remove the residual base, dried and packaged. The initial crosslinking step creates microcracks or longitudinal slits in non-porous polyethylene film which are so small they are not visible even under an electron microscope. The diameter of these microcracks is estimated to be about 20 Angstroms ($10^{-8}$ cm). The microcracks are then grafted with the methacrylic acid. The resulting film is therefore not microporous in the sense of the microporous films employed in the present invention which have an average size of about 100 to about 5,000 Angstroms. The extremely small size of the microcracks of PERMION TM generally prohibits a mass transfer of mobile electron carrying species generated by oxidation-reduction reactions through the film at any substantial rate. This is reflected in the relatively high (e.g., 30 to 40 milliohms-in$^2$) electrical resistances evidenced by films of this type. Moreover, PERMION TM is not dimensionally stable in more than one direction as evidenced by substantial swelling.

It is well known that non-porous polymeric substrates such as polyethylene and polypropylene may be reacted with various monomers such as acrylic acid using various types of ionizing radiation as illustrated by U.S. Pat. Nos. 2,999,056; 3,281,263; 3,372,100; and 3,709,718. Since none of these patents are directed to microporous films, however, they are not directed to the peculiar problems associated therewith.

Thus, the search has continued for a relatively permanently wettable, hydrophilic microporous film which exhibits low electrical resistance, and improved water flow rates through the microporous film. The present invention was developed in response to this search.

It is therefore an object of the present invention to provide a process for rendering a normally hydrophobic microporous film relatively permanently hydrophilic thereby improving its water permeability.

It is another object of the present invention to provide a process for reducing the electrical resistance of a normally hydrophobic microporous film.

It is still another object of the present invention to provide a hydrophilic microporous film having reduced electrical resistance.

It is a still further object to overcome the problems of the prior art discussed above.

These and other objects, as well as the scope, nature and utilization of the claimed invention, will be apparent to those skilled in the art from the following detailed description and appended claims.

SUMMARY OF THE INVENTION

In one aspect of the present invention there is provided a process for rendering a normally hydrophobic polyolefinic microporous film hydrophilic, improving the water flow rate therethrough, and reducing the electrical resistance thereof which comprises:

(a) coating the surface of the micropores of a normally hydrophobic polyolefinic open celled microporous film characterized by having a reduced bulk density as compared to the bulk density of a precursor film from which it is prepared, an average pore size of from about 200 to about 10,000 Angstroms, and a surface area of at least about 10 square meters per gram, with at least one hydrophilic organic hydrocarbon monomer having from about 2 to about 18 carbon atoms characterized by the presence of at least one double bond and at least one polar functional group; and (b) chemically fixing to the surface of the micropores of the microporous film an amount of said hydrophilic organic hydrocarbon monomer sufficient to preserve the open celled nature of said micropores and sufficient to obtain an add-on of from about 0.1 to about 10%, by weight, based on the weight of the uncoated microporous film by irradiating the coated microporous film of (a) with from about 1 to about 10 megarads of ionizing radiation.

In another aspect of the present invention there is provided a hydrophilic open celled microporous film which comprises:

(a) an open celled normally hydrophobic microporous film characterized by having a reduced bulk density as compared to the bulk density of a precursor film from which it is prepared, an average pore size of from about 200 to about 10,000 Angstroms and a surface area of at least 10 square meters per gram; and (b) a coating on the surface of the micropores of the microporous film of at least one hydrophilic organic hydrocarbon monomer having from about 2 to about 18 carbon atoms characterized by the presence of at least one double bond and at least one polar function group, said hydrophilic organic hydrocarbon monomer coating being chemically fixed to the surface of the micropores of the microporous film, by exposure to from about 1 to about 10 megarads of ionizing radiation, and in an amount sufficient to preserve the open celled nature of the microporous film and to obtain an add-on of from about 0.1 to about 10%, by weight, based on the weight of the uncoated microporous film.

The essence of the present invention lies in the discovery that open celled microporous films may be rendered relatively permanently wettable and/or hydrophilic when the pores thereof are chemically fixed with a controlled amount of graftable hydrophilic monomers by exposure to ionizing radiation while preserving the open celled nature of the microporous film. Moreover, such chemical fixation of the hydrophilic monomers occurs even within those pores located at an interior site within the microporous film. It is believed that by controlling the amount of monomer which is chemically fixed to the surface of the micropores, the polymer chain graft which results upon exposure to radiation can be aligned with the surface of the pores. Therefore, entanglement and plugging of the pores, is avoided.

DESCRIPTION OF PREFERRED EMBODIMENTS

The present invention is directed to a hydrophilic microporous film and a process for making the same.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the pores of the porous films of the present invention are microscopic, i.e., the details of their pore configuration or arrangement are discernible only by microscopic examination. In fact, the open cell pores in the films generally are smaller than those which can be measured using an ordinary light microscope, because the wave length of visible light, which is about 5,000 Angstroms (an Angstrom is one ten-billionth of a meter), is longer than the longest planar or surface dimension of the open cell or pore. The microporous films of the present invention may be identified, however, by using electron microscopy techniques which are capable of resolving details of pore structure below 5,000 Angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film where gross volume is determined by immersing a known weight of the film in a vessel partly filled with mercury at 25° C. and atmospheric pressure. The volumetric rise in the level of mercury is a direct measure of the gross volume. This method is known as the mercury volume-nometer method, and is described in the *Encyclopedia of Chemical Technology*, Vol. 4, page 892 (Interscience 1949).

Porous films have been produced which possess a microporous, open-celled structure, and which are also characterized by a reduced bulk density. Films possessing this microporous structure are described, for example, in U.S. Pat. No. 3,426,754 which patent is assigned to the assignee of the present invention and herein incorporated by reference. The preferred method of preparation described therein involves drawing or stretching at ambient temperatures, i.e., "cold drawing", a crystalline, elastic precursor film in an amount of about 10 to 300 percent of its original length, with subsequent stabilization by heat setting of the drawn film under a tension such that the film is not free to shrink or can shrink only to a limited extent. Other methods of preparing microporous film are exemplified by U.S. Pat. Nos. 3,558,764; 3,843,762; 3,920,785; British Pat. Nos. 1,180,066 and 1,198,695 which are all herein incorporated by reference.

While all of the above-listed patents describe processes for preparing normally hydrophobic microporous films which may be rendered hydrophilic in accordance with the present invention, the preferred normally hydrophobic microporous films are provided in accordance with the processes described in U.S. Pat. No. 3,801,404 which defines a method for preparing microporous films herein referred to as the "dry stretch" method and U.S. Pat. No. 3,839,516 which defines a method for preparing microporous films herein referred to as the "solvent stretch" method, both of which are herein incorporated by reference. Each of these patents discloses preferred alternative routes for obtaining a normally hydrophobic microporous film by manipulating a precursor film in accordance with specifically defined process steps.

The preferred precursor films which may be utilized to prepare microporous films in accordance with the "dry stretch" and "solvent stretch" methods are specifically detailed in each of the above respective patents. Thus, the "dry stretch" method utilizes a non-porous crystalline, elastic, polymer film having an elastic recovery at zero recovery time (hereinafter defined) when subjected to a standard strain (extension) of 50 percent at 25° C. and 65 percent relative humidity of at least 40 percent, preferably at least about 50 percent and most preferably at least about 80 percent.

Elastic recovery as used herein is a measure of the ability of structure or shaped article such as a film to return to its original size after being stretched, and may be calculated as follows: Elastic Recovery (ER)%

$$= \frac{\text{length when stretched} - \text{length after stretching}}{\text{length added when stretched}} \times 100$$

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent, and most preferably at least 50 percent, e.g., about 50 to 90 percent, or more. Percent crystallinity is determined by the X-ray method described by R. G. Quynn et al in the *Journal of Applied Polymer Science*, Vol. 2, No. 5, pp. 166–173 (1959). For a detailed discussion of crystallinity and its significance in polymers, see *Polymers and Resins,* Golding (D. Van Nostrand, 1959).

Other elastic films considered suitable for preparing percursor films utilized in the dry stretch method are described in British Pat. No. 1,052,550, published Dec. 21, 1966.

The precursor elastic film utilized in the preparation of the microporous films by the "dry stretch" process route should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperature, are particular consequences of entropy-elasticity. The elasticity of the precursor elastic films utilized herein, on the other hand, is of a different nature. In qualitative thermodynamic experiments with these elastic precursor films, increasing stress with decreasing temperature (negative temperature coefficient) may be interpreted to mean that the elasticity of these materials is not governed by entropy effects but dependent upon an energy term. More significantly, the "dry stretch" precursor elastic films have been found to retain their stretch properties at temperatures where normal entropy-elasticity could no longer be operative. Thus, the stretch mechanism of the "dry stretch" precursor elastic films is thought to be based on energy-elasticity relationships, and these elastic films may then be referred to as "non-classical" elastomers.

Alternatively, the "solvent stretch" method utilizes a precursor film which must contain at least two components, e.g., an amorphous component and a crystalline component. Thus, crystalline materials, which are by nature two components, work well with the process. The degree of crystallinity of the precursor film must therefore be at least 30%, preferably at least 40% and most preferably at least 50% by volume of the precursor film.

The polymers, i.e, synthetic resinous material from which the precursor films utilized in either process in accordance with the present invention include the olefin polymers, such as polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1.

For example, in general when propylene homopolymers are contemplated for use in the "dry stretch" method, an isotatic polypropylene having a percent crystallinity as indicated above, a weight average molecular weight ranging from about 100,000 to 750,000 (e.g., about 200,000 to 500,000) and a melt index (ASTM-D-1238-57T, Part 9, page 38) from about 0.1 to about 75, (e.g., from about 0.5 to 30), can be employed so as to give a final film product having the requisite physical properties.

It is to be understood that the terms "olefinic polymer" and "olefin polymer" are used interchangeably and are intended to describe a polymer prepared by polymerizing olefin monomers through their unsaturation.

Preferred polymers for use in the "solvent stretch" method are those polymers utilized in accordance with the invention described in U.S. Pat. No. 4,255,376 by John W. Soehngen and assigned to the Assignee of the present invention, entitled "Improved Solvent Stretch Process for Preparing Microporous Films from Precursor Films of Controlled Crystalline Structure" the disclosure of which is herein incorporated by reference. Thus, a polyethylene homopolymer having a density of from about 0.960 to about 0.965 gm/cc, a high melt index of not less than about 3 and preferably from about 3 to about 20 and a broad molecular weight distribution ratio ($\overline{M}_w/\overline{M}_n$) of not less than about 3.8 and preferably from about 3.8 to about 13 is preferred in preparing a microporous film by the "solvent stretch" method. Moreover, nucleating agents may be incorporated into the polymer employed to prepare the precursor film as described in the incorporated Soehngen Application in which case the polymers having a melt index as low as 0.3 may be employed.

The types of apparatus suitable for forming the precursor films are well known in the art.

For example, a conventional film extruder equipped with a shallow channel metering screw and coat hanger die is satisfactory. Generally, the resin is introduced into a hopper of the extruder which contains a screw and a jacket fitted with heating elements. The resin is melted and transferred by the screw to the die from which it is extruded through a slit in the form of a film from which it is drawn by a take-up or casting roll. More than one take-up roll in various combinations or stages may be used. The die opening or slit width may be in the range, for example, of about 10 to 200 mils.

Using this type of apparatus, film may be extruded at a drawdown ratio of about 5:1 to 200:1, preferably 10:1 to 50:1.

The terms "drawdown ratio" or more simply, "draw ratio", as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C., preferably 200° C. to 240° C. Polyethylene may be extruded at a melt temperature of about 175° to 225° C.

When the precursor film is to be utilized in accordance with the "dry stretch" method, the extrusion operation is preferably carried out with rapid cooling and rapid drawdown in order to obtain maximum elasticity. This may be accomplished by having the take-up roll relatively close to the extrusion slot, e.g., within two inches and, preferably, within one inch. An "air knife" operating at temperatures between, for example, 0° C. and 40° C., may be employed within one inch of the slot to quench, i.e., quickly cool and solidify, the film. The take-up roll may be rotated, for example, at a speed of 10 to 1000 ft/min, preferably 50 to 500 ft/min.

When the precursor film is to be utilized in accordance with the "solvent stretch" method, the extrusion operation is preferably carried out with slow cooling, in order to minimize stress and any associated orientation which might result from a fast quench to obtain maximum crystallinity but yet fast enough to avoid developing large spherulities This may be accomplished by controlling the distance of the chill roll take-up from the extrusion slit.

While the above description has been directed to slit die extrusion methods, an alternative method of forming the precursor films contemplated in this invention is the blown film extrusion method wherein a hopper and an extruder are employed which are substantially the same as in the slit extruder described above.

From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Using the blown film method, the drawdown ratio is preferably 5:1 to 100:1, the slot opening 10 to 200 mils, preferably 40 to 100 mils, the $D_2/D_1$ ratio, for example, 1.0 to 4.0 and preferably about 1.0 to 2.5, and the take-up speed, for example, 30 to 700 ft/min. The melt temperature may be within the ranges given previously for slit die extrusion.

The extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100° to 155° C.

An exemplary method of carrying out the annealing is by placing the extruded film in a tensioned or tensionless state in an oven at the desired temperature in which case the residence time is preferably in the range of about 30 seconds to 1 hour.

In the preferred embodiments, the resulting partly-crystalline precursor film is preferably subjected to one of the two alternative procedures described above to obtain a normally hydrophobic microporous film which may be utilized in accordance with the present invention.

The first preferred procedure as disclosed in U.S. Pat. No. 3,801,404, herein referred to as the "dry stretch" method includes the steps of cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heatsetting the resulting porous film under tension, i.e., at substantially constant length, to impart stability to the film.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morophology of the film. For example, polypropylene elastic film may be cold stretched at a temperature below about 120° C. preferably between about 10° C. and 70° C. and conveniently at ambient temperature, e.g., 25° C. The cold stretched polypropylene film may then be hot stretched at a temperature above about 120° C. and below the fusion temperature, and preferably between about 130° C. and 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5 percent of its cold stretched length, before being hot stretched.

The sum total amount of stretching in the above two steps may be in the range of about 10 to 300 percent and preferably about 50 to 150 percent, based on the initial length of the elastic film. Further, the ratio of the amount of hot stretching to the sum total amount of stretching or drawing may be from above about 0.10:1 to below 0.99:1, preferably from about 0.50:1 to 0.97:1, and most preferably from about 0.50:1 to 0.95:1. This relationship between the "cold" and "hot" stretching is referred to herein as the "extension ratio" (percent "hot" extension to the percent "total" extension).

In any stretching operations where heat must be supplied the film may be heated by moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125° C. up to less than the fusion temperature, and preferably about 130° to 160° C. for polypropylene; from about 75° C. up to less than fusion temperature, and preferably about 115° C. to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, should not be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

A second preferred alternative procedure for converting the precursor film to a microporous film as described in U.S. Pat. No. 3,839,516 and herein referred to as the "solvent stretch" method includes the basic steps of (1) contacting the precursor film having at least two components (e.g. an amorphous component and a crystalline component), one of which is lesser in volume than all the other components, with a swelling agent for sufficient time to permit adsorption of the swelling agent into the film; (2) stretching the film in at least one direction while in contact with swelling agent, and (3) maintaining the film in its stretched state during removal of the swelling agent. Optionally, the film may be stabilized by heat-setting under tension or by ionizing radiation.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

General classes of swelling agents from which one appropriate for the particular polymeric film may be chosen are lower aliphatic ketones such as acetone, methyl ethylketone, cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

It is preferred that the swelling agents be a compound composed of carbon, hydrogen, oxygen, nitrogen, halogen, sulfur and contain up to about 20 carbon atoms, preferably up to about 10 carbon atoms.

The "solvent stretching" step may be conducted at a temperature in range from above the freezing point of the solvent, or swelling agent, to a point below the temperature at which the polymer dissolves (i.e., ambient temperature to about 50° C.).

The precursor film employed in the "solvent stretch" process may range from 0.1 to about 20 mils, or even thicker.

In a preferred embodiment the precursor film is biaxially stretched in accordance with the procedures disclosed in U.S. Pat. No. 4,257,997, June 1, 1979, entitled "Improved Solvent Stretching Process for Preparing Microporous Films" and assigned to the assignee of the present invention the disclosure of which is herein incorporated by reference. This process identifies preferred stretching conditions in a uniaxial direction which lead to improved permeability of the uniaxially stretched microporous film. The uniaxially stretched microporous film can then be stretched in a transverse direction to improve the permeability even further. Thus, it is preferred that the precursor film be "solvent stretched" in a uniaxial direction not greater than about 350%, and most preferably 300% greater than its original length. Typically, additional stretching in the same direction after the solvent removal is not employed.

The optional stabilizing step may be either a heat-setting step or a cross-linking step. This heat treatment may be carried out at a temperature in the range from about 125° C. up to less than the fusion temperature and preferably about 130° to 150° C. for polypropylene; from about 75° C. up to less than fusion temperature, and preferably about 115° to 130° C. for polyethylene and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the "solvent stretching" operation, shouldn't be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

When the precursor film is biaxially stretched the stabilizing step should be conducted after transverse stretching and not before.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer for purposes of polymer stability is a "random" oxymethylene copolymer, which contains recurring oxymethylene, i.e, $-CH_2-O-$, units interspersed with $-OR-$ groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and where a major amount of the $-OR-$ units exist as single units attached to oxymethylene groups on each side. Examples or preferred polymers include copolymers of trioxane and cyclic ethers, containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150° C. and a number average molecular weight of at least 10,000. For a more detailed discussion of acetal and oxymethylene polymers, see *Formaldehyde*, Walter, pp. 175-191, (Reinhold 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), all of which are well known in the art and need not be described further herein for the sake of brevity.

The normally hydrophobic microporous films employed in the present invention, in a tensionless state, have a lowered bulk density compared with the density of corresponding polymeric materials having no opencelled structure, e.g., those from which it is formed. Thus, the films have a bulk density no greater than about 95 percent and preferably 20 to 40 percent of the precursor film. Stated another way, the bulk density is reduced by at least 5 percent and preferably 60 to 80 percent. For polyethylene, the reduction is 30 to 80 percent, preferably 60 to 80 percent. The bulk density is about 20 to 40 percent of the starting material, the porosity has been increased by 60 to 80 percent because of the pores or holes.

When the microporous film is prepared by the "drystretch" or solvent "stretch methods" the final crystallinity of the microporous film is preferably at least 30 percent, more preferably at least 65 percent, and more suitably about 70 to 85 percent, as determined by the X-ray method described by R. G. Quynn et al in the *Journal of Applied Polymer Science*, Vol 2, No. 5, pp. 166–173. For a detailed discussion of crystallinity and its significance in polymers, see *Polymers and Resins*, Golding (S. Van Nostrand, 1959).

The microporous films which can be employed in the present invention may also have an average pore size of from about 200 to 10,000 Å, typically from about 400 to 5000 Å, and more typically about 500 to about 5000 Å. These values can be determined by mercury porosimetry as described in an article by R. G. Quynn et al, on pages 21–34 of *Textile Research Journal*, January, 1963 or by the use of electron microscopy as described in Geil's *Polymer Single Crystals*, p. 69 (Interscience 1963). When an electron micrograph is employed pore length and width measurements can be obtained by simply utilizing a ruler to directly measure the length and width of the pores on an electron micrograph taken usually at 5,000 to 10,000 magnification. Generally, the pore length values obtainable by electron microscopy are approximately equal to the pore size values obtained by mercury porosimetry.

The microporous films employed in the present invention will exhibit a surface area within certain predictable limits when prepared by either the "solvent stretch" method or the "dry stretch" method. Typically such microporous films will be found to have a surface area of at least 10 sq.m/gm and preferably in the range of about 15 to 25 sq.m/gm. For films formed from polyethylene, the surface area generally ranges from about 10 to 25 sq.m/gm. and preferably about 20 sq.m/gm.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area expressed as square meters per cc.

The normally hydrophobic microporous polymeric films of the instant invention which is rendered hydrophilic has a preferred thickness of from about 1 mil (0.001 inch) to about 8 mils.

The normally hydrophobic microporous film prepared in accordance with the procedures described above is rendered wettable, and/or hydrophilic by coating the surface of the micropores of the microporous film with a hydrophilic monomer or mixture thereof and subsequently exposing the coated microporous film to ionizing radiation. The ionizing radiation chemically fixes the hydrophilic monomer to the micropore surface and renders it relatively permanently hydrophilic. The add-on or amount of hydrophilic monomer which is chemically fixed is controlled within certain limits to avoid plugging of the pores while at the same time permitting control of the total porosity of hydrophilic film. Control of porosity in turn permits control of the water permeability and electrical resistance of the film.

As used herein the term "hydrophobic" is defined as meaning a surface which passes less than about 0.010 milliliters of water per minute per $cm^2$ of flat film surface under a water pressure of 100 psi. Likewise the term "hydrophylic" is meant to apply to those surfaces which pass greater than about 0.01 milliliters of water per minute per $cm^2$ at the same pressure.

The hydrophilic monomers which may be employed to coat the pore surface of the microporous film of the present invention are organic hydrocarbon compounds having from 2 to 18 carbon atoms characterized by the presence of at least one double bond which renders the monomers polymerizable, and/or co-polymerizable under the influence of ionizing radiation at a temperature which would not adversely affect the microporous film and at least one polar functional group such as carboxy, sulfo, sulfino hydroxyl, ammonio, amino, and phosphono.

Accordingly, the hydrophilic monomers of the present invention include hydrocarbon compounds having from 2 to 18 carbon atoms with one or more polymerizable and/or copolymerizable double bonds such as substituted and unsubstituted carboxylic or dicarboxylic acids and esters thereof; vinyl and allyl monomers, particularly itaconic acid, malonic acid, fumaric acid, and crotonic acid, and their esters or anhydrides, unsubstituted or alkyl-substituted acrylic acids such as acrylic acid and methacrylic acid, acrolein, or acrylonitrile; unsubstituted or alkyl-substituted alkyl, cycloalkyl, aryl, hydroxyalkyl, or hydroxyalkyl acrylates, alkyl-substituted dialkylaminoalkyl acrylates, epoxyalkyl acrylates; vinyl sulfonic acid, and styrene sulfonic acid; vinyl esters such as vinyl acetate and higher carboxylic acid vinyl esters, alkyl substituted vinyl esters of carboxylic acids containing sulfo groups; vinyl ethers, such as unsubstituted or substituted alkyl, cycloalkyl or aryl vinyl ethers; vinyl-substituted silicones; vinyl-substituted aromatic or heterocyclic hydrocarbons; diallyl fumarates; diallyl maleates; alkyl-substituted phosphates, phosphites or carbonates; vinyl sulfones, the reaction product of ethoxylated monylphenol and acrylic acid and the like.

Since it is intended that the hydrophilic monomer penetrate to the interior of the microporous film it is preferred to employ hydrophilic monomers having from about 2 to about 14, most preferably from about 2 to about 4 carbon atoms.

The preferred hydrophilic monomers employed in the present invention are acrylic acid, methacrylic acid, and vinyl acetate.

The amount of hydrophilic monomer which coats the interior surface of the pores of the microporous film is controlled to achieve the proper degree of add-on which is determined by the films intended water flow or electrical resistance end use requirements. As described above, such control is exerted in a manner sufficient to preserve the open celled nature of the micropores, i.e., avoid plugging of the pores, after the monomer impregnated microporous film is subjected to the radiation treatment described herein such that the desired properties discussed above are maintained for a longer duration than is otherwise obtainable using the typical surfactant coatings of the prior art. The specific amount of hydrophilic monomer which is chemically fixed onto the surface of the pores is expressed in terms of percent add-on, i.e., that percent by weight of the uncoated microporous film which represents the weight of the hydrophilic monomer coating which is present in the cured microporous film.

Accordingly, to avoid pore plugging of the microporous films described herein, the percent add-on of the hydrophilic monomer which is chemically fixed to the surface of the micropores is controlled to be not greater than about 10%, and generally from about 0.1 to about 10%, preferably from about 0.5 to about 2.5%, and most preferably from about 1 to about 2.0% (e.g., 1.5%) by weight, based on the weight of the uncoated microporous film.

The particular percent add-on selected will be determined by the end use for which the resulting hydrophilic microporous film is employed and will vary within the broad range of add-on percentages described above.

For example, when the grafted hydrophilic microporous film is intended to be used as an electrical battery separator the percent add-on is selected on the basis of the electrical resistance of the resulting hydrophilic microporous film (in milliohms per square inch) which is a function of percent add-on of the hydrophilic monomer.

Electrical resistance as defined herein is a measure of the ability of the microporous film to conduct electrons. Consequently, as a general rule the higher the electrical resistance of the microporous film the less effective the microporous film will be as a battery separator.

Thus, the electrical resistance of the microporous film is determined at various add-on percentages of the hydrophilic monomer and a plot of electrical resistance as a function of percent add-on is made. The percent add-on is then determined on the basis of the desired electrical resistance.

The electrical resistance of the hydrophilic microporous film of the present invention as hereinafter described will generally be controlled to be less than about 30 milliohms per square inch (milliohms-in.$^2$), preferably less than about 10 milliohms-in.$^2$, and most preferably less than about 5 milliohms-in$^2$ inch.

When the grafted hydrophilic microporous film is to be used as a filter, the percent add-on of the microporous film is selected on the basis of the water flow rate through the microporous film as herein defined.

Accordingly, the water flow rate may be plotted as a function of percent add-on of the hydrophilic monomer and the appropriate percent add-on is selected on the basis of the desired water flow rate.

When the microporous film is intended to be used for filtration purposes the pore size of the film is selected to act as a barrier for the material to be separated and the water flow rate is controlled as desired within the limits of the pore size selected. Thus, the water flow rate can be controlled to be greater than about 0.01 cc/min/cm$^2$, preferably greater than about 0.05 cc/min/cm$^2$, and most preferably greater than about 0.5 cc/min/cm$^2$ at a pressure differential of about one atmosphere.

Thus, the present invention has several advantages over hydrophilic films prepared in the past. Since it is possible to preserve the open celled nature of the hydrophilic microporous film prepared in accordance with the present invention such films permit a mass transport of water through the film as opposed to transport of water through the film by diffusion which is a much slower process. The mass transport effect also contributes to the reduction in electrical resistance. Another advantage of the microporous films of the present invention results from the chemical fixation of the hydrophilic monomer to the microporous film which extends the duration of the presence of the hydrophilic monomer on the micropore surface over longer periods of time than typical surfactants, particularly after repeated washings. Moreover, the dimensional stability of the films of the present invention is also improved.

It is appropriate to mention that it is preferred when possible to convert the polar functional group of the hydrophilic monomer to its most polar form. This can be achieved, for example, by reacting an acid functional group with a base such as KOH to form the corresponding salt. Thus, the salt form can be achieved in this instance by soaking the chemically fixed film in a 2% solution of KOH for a period of from about 5 to about 30 minutes. This enhances the wettability and increases the flexibility of the film.

Any of the well known coating methods may be employed to coat the microporous film, provided such methods supply a sufficiently accurate control of the percent add-on of the hydrophilic monomer.

The preferred method for accurately and efficiently coating the interior surface of the pores of the microporous film is to contact the microporous film with a vapor of the monomer which condenses on the micropore surface.

The percent add-on can be controlled by controlling the equilibrium vapor pressure (i.e. the vapor pressure wherein the rate of condensation of the monomer vapor equals its rate of vaporization at a given temperature) of the hydrophilic monomer and the time during which the hydrophilic monomer is in contact with the microporous film.

The equilibrium vapor pressure required to achieve the desired amount of the hydrophilic monomer coating at a constant temperature is determined from plots of percent add-on versus time at various equilibrium vapor pressures while keeping the temperature constant. The percent add-on selected as described above depends upon the particular property sought to be imparted to the microporous film.

The equilibrium vapor pressure required to achieve the appropriate percent add-on is easily determined from the above described plots. The contact time of the monomer vapor with the microporous film is also determined in a similar manner.

Thus, in a continuous process the microporous film is continuously passed through a chamber containing the hydrophilic monomer vapor at the appropriate equilibrium vapor pressure and temperature. The duration of contact of the microporous film with the hydrophilic monomer vapor is controlled by adjusting the path length and line speed of the microporous film through the vapor.

Obviously the vapor coating technique can only be employed when the critical temperature of the hydrophilic monomer (i.e., the temperature at which a liquid monomer cannot exist regardless of pressure) is above the temperature at which the properties of microporous film would be adversely affected at the particular contact time employed.

It is preferred that the vapor-coating technique be conducted at atmospheric pressure at a temperature which yields the appropriate vapor pressure.

Typically the temperatures at which the vapor coating technique is conducted when atmospheric pressure is employed will vary from about 50° to about 170° C. when the hydrophilic monomer employed is acrylic acid, methacrylic acid, or vinyl acetate.

Sub-atmospheric and super atmospheric pressure may also be employed with appropriate adjustments in temperature and contact time.

It should be understood that since the percent add-on is determined after the cure treatment, an amount of hydrophylic monomer in excess of the percent add-on is initially applied to the microporous film to compensate for loss of the monomer which may occur during the cure treatment.

Other suitable methods by which the microporous film may be coated with the hydrophilic monomer include dissolving the hydrophilic monomer in a vaporizable solvent such as methylene chloride to form a pad bath.

The pad bath may then be employed in a reverse roll coating technique. In this method a doctor roll is disposed partially in the pad bath of the monomer coating solution. A second driven roll guides an uncoated hydrophobic microporous film web through the nip formed by itself and the doctor roll. The two rolls which are preferably separately driven, rotate in the same direction so that the coated film web is guided in the direction from whence the uncoated film originates. The amount of monomer coating disposed on the film is a function of the difference in speed of the doctor roll and the second film driving roll and also the size of the nip formed by the two rolls.

Alternatively, a squeeze roll method may be employed. The film in this method is guided into a pad bath of the monomer coating solution and squeezed between two squeeze rolls disposed downstream thereof. The amount of coating is thus a function of the gap size between the two squeeze rolls and the pressure exerted therebetween.

Another alternative method for coating the substrate hydrophobic microporous film is the wire wound metering rod method. This method is the same as the squeeze roll method except that the microporous film after being coated by being guided through a bath of the monomer coating solution is squeezed between a pair of wire wound metering rods which control the amount of coating disposed thereon by the configuration of the wires wound around the metering rods.

In the reverse roll, squeeze roll, and wire wound coating techniques the amount of hydrophilic monomer initially applied to the microporous film is a function of one or two variables discussed in the description of the methods. In addition, in all three methods the amount of the monomer coating is also a function of the concentration of the monomer in the pad bath. The hydrophilic monomer pad bath is provided by dissolving the monomer in a common organic solvent which has a boiling point lower than the boiling point of the hydrophilic monomer employed, such as in addition to methylene chloride, acetone, methanol, ethanol, and isopropanol.

The concentration of the hydrophilic monomer in the pad bath is controlled to achieve application of the appropriate amount of monomer upon evaporation of the solvent. Generally the monomer concentration in the pad bath can vary from about 1 to about 30%, and preferably from about 5 to about 15% by weight, based on the weight of the bath.

When the hydrophilic monomers are coated on the microporous film using a pad bath the solvent present therein is removed by passing the coated film through a drier. The temperature of the drier should be high enough to evaporate the solvent only thereby leaving the monomer deposited on the micropore surface of the film.

After the pores of the microporous film have been coated with the hydrophilic monomer and solvent if any, removed therefrom, the coated microporous film is subjected to ionizing radiation to chemically fix the hydrophilic monomer to the normally hydrophobic micropore surface and render it hydrophilic.

When subjected to ionizing radiation a number of possible mechanisms or combinations thereof may operate to achieve the desired effect. Thus, the hydrophilic monomers may become chemically attached to the micropore surface and/or may form by polymerization and/or copolymerization a polymeric layer or sleeve which is intimately bonded to the micropore surface chemically, such as by random chemical attachment of the sleeve surface to the micropore surface, and/or physically, as a result of the confining effect on the polymeric sleeve of the contour of the micropore surface. The term "chemical fixation" is intended to embody all of the above mechanisms or combinations thereof.

Without being restricted to the particular mechanisms by which the desired improvement may be achieved the properties of the normally hydrophobic microporous film are modified in one or more ways depending upon the percent add-on of the hydrophilic monomer.

Thus, the resulting radiation treated microporous film is rendered hydrophilic over a longer period of use than is otherwise obtained by typical surfactant coatings and yet the open celled nature of the film can be preserved for use of the microporous film in those applications where mass transport and low electrical resistance is required.

As indicated above chemical fixation of the hydrophilic monomers to the normally hydrophobic microporous film is achieved by exposing the hydrophilic monomer impregnated microporous film to ionizing radiation.

Ionizing radiation is herein defined to consist essentially of the type which provides emitted particles or photons having an intrinsic energy sufficient to produce ions and break chemical bonds and thereby induce free radical reactions between the hydrophilic monomers employed and between the monomers and the micropore surface as described herein. Ionizing radiation is conveniently available in the form of ionizing particle radiation, ionizing electromagnetic radiation, and actinic light.

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as a low energy (i.e., 200 KeV) elongated electron beam generator such as the ELECTROCURTAIN® manufactured by Energy Sciences Corporation, accelerators with resonance chambers, Van Der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.) In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

The hydrophilic monomers described herein will also undergo chemical fixation by exposure to actinic light. In general, the use of wave lengths in which sensitivity to actinic light occurs is approximately 1,800 to 4,000 angstrom units. Various suitable sources of the actinic light are available in the art including by way of example, quartz mercury lamps, ultraviolet cored carbon arcs, and high flash lamps. Initiators may be employed when actinic light is used.

The preferred source of ionizing radiation is the elongated electron beam generator such as described in U.S. Pat. Nos. 3,702,412; 3,745,396; and 3,769,600 which are herein incorporated by reference.

The techniques for accurate process control are sufficiently developed to permit conversion of results from one type of radiation to the other and adequate adjustment of the techniques described herein may be employed interchangeably in the production of any desired product.

A radiation dosage of about 1.0 to about 10 megarads (mrad.), and preferably from about 2 to about 5 mrad. (e.g., 3 mrad.) is employed to achieve chemical fixation. A megarad is one million rads. A rad is the amount of ionizing high energy radiation which produces an absorption of 100 ergs of energy per gram of absorbing material. This unit is widely accepted as a convenient means of measuring radiation absorption by material.

Preferably, the minimum ionizing radiation is employed to achieve chemical fixation due to economic considerations. Excessive dosages (i.e., greater than about 20 mrads. at a single exposure) should be avoided to avoid excess heating and shrinkage of the film and degradation of the hydrophilic monomers and the microporous film. If the dosage is too small, however the chemical fixation will not be achieved and the hydrophilic monomer will quickly be lost.

The minimum radiation dosage which will achieve chemical fixation of the hydrophilic monomer will vary depending on the type of polymer employed to prepare the microporous film. Thus, for example, when the polymer is polyethylene the radiation dosage should not be less than about 1 mrad. while for polypropylene the radiation dosage should not be less than about 2 mrad. and preferably not less than about 3 mrad.

Room temperatures may be employed satisfactorily for irradiation although elevated temperatures may also be employed.

Since oxygen tends to inhibit grafting of the hydrophilic monomer to the microporous film it is preferred to conduct the radiation treatment of the microporous film under an inert atmosphere such as nitrogen or other inert gas.

As discussed earlier, the percent add-on may be selected on the basis of the electrical resistance of the microporous film.

Electrical resistance (direct current method) of a microporous film is determined by soaking a sample of the microporous film having a known surface area (e.g., 0.2 sq. inches) in a 40% by weight, solution of KOH in water for 24 hours. The resulting sample is then disposed between working cadmium electrodes (i.e., anode and a cathode) immersed in an electrolyte of a 40%, by weight, solution of KOH in water and a direct current of known amperage (e.g. 40 milliamperes) is passed through the cell between the electrodes. The potential drop across the film (E) is measured with an electrometer. The potential drop across the cell without the microporous film disposed therein (E') is also determined using the same current.

The electrical resistance of the microporous film is then determined using the equation:

$$E.R. = \frac{(E' - E)A}{I}$$

where A is the surface area of the exposed film in square inches, I is the current across the cell in milliamperes, E.R. is the electrical resistance of the microporous film in milliohms per square inch, and E' and E are as described.

The water permeability or the water flow rate of the hydrophilic microporous film of the present invention is determined by measuring the rate of flow of water through a specific surface area of film while the water is under a differential pressure of one atmosphere. Thus, the water flow rate is expressed in units of volume of water in cubic centimeters per minute per square centimeter of film surface i.e., cc/minute/cm$^2$.

The air permeability of the microporous films of the present invention is determined by the Gurley test, i.e., according to ASTM D 726 by mounting a film having an area of one square inch in a standard Gurley densometer. The film is subject to a standard differential pressure (the pressure drop across the film) of 12.2 inches of water. The time in seconds required to pass 10 cm$^3$ of air through the film is an indication of permeability. A Gurley value of greater than about 1.5 minutes is an indication that the pores are plugged.

The hydrophilic microporous films of this invention find many varying uses. In particular, usefulness is found in areas where the controlled passage of moisture through a film or surface is desired. Furthermore, films made according to this invention can be used as filter membrane supports or filters useful in separating ultrafine materials from various liquids and as battery separators.

The present invention is further illustrated by the following examples. All parts and percentages in the examples as well as in the specification and claims are by weight unless otherwise specified.

EXAMPLE 1

PART A

This discussion illustrates the preparation of a normally hydrophobic polyolefinic microporous film by the "dry stretch" method as illustrated by U.S. Pat. No. 3,801,404.

Crystalline polypropylene having a melt index of 0.7 and a density of 0.92 is melt extruded at 230° C. through an 8 inch slit die of the coat hanger type using a 1 inch extruder with a shallow metering screw. The length to diameter ratio of the extruder barrel is 24/1. The extrudate is drawn down very rapidly to a melt drawdown ratio of 150, and contacted with a rotating casting roll maintained at 50° C., and 0.75 inches from the lip of the die. The film produced in this fashion is found to have the following properties: thickness, 0.002 inches; recovery from 50 percent elongation at 25° C., 50.3 percent; crystallinity, 59.6 percent.

A sample of this film is oven annealed with air with a slight tension at 140° C. for about 30 minutes, removed from the oven and allowed to cool.

The sample of the annealed elastic film is then subjected to cold stretching and hot stretching at an extension ratio of 0.50:1, and thereafter heat set under tension, i.e., at constant length, at 145° C. for 10 minutes in air. The cold drawing portion is conducted at 25° C., the hot drawing portion is conducted at 145° C., and total draw is 100 percent, based on the original length of the elastic film. The resulting film has an average pore size length of about 3,000 Angstroms, a crystallinity of about 59.6%, and a surface area of about 8.54 m$^2$/gm. The thickness of the microporous film is 1 mil.

PART B

A continuous roll of the microporous film 100 feet in length and 6 inches width, prepared in accordance with Part A is then passed through a bath of glacial acrylic acid (i.e. 100%) and then through a squeeze roll to obtain an add-on of 1.5% after cure, by weight, based on the weight of the film prior to impregnation as determined by I.R. analysis. The impregnated film is then passed beneath the window of an elongated electron beam generator (i.e., 24 inches in length) at a line speed of 20 feet per minute. The election beam generator is set to provide a dose of 3 megarads at the line speed employed.

The oxygen content of the atmosphere below the window of the curtain and in contact with the microporous film is maintained below 500 ppm by enclosing the window in a chamber purged with Nitrogen.

A sample of cured dry microporous film is then tested for wettability by the drop test. The drop test is conducted by placing a 0.6 ml. drop of 2% KOH in water on the surface of the film. The film is then visually observed. If the portion of the film on which the drop is placed becomes translucent and the opposite side of the film on which the drop is placed appears wet the film is determined to be wetted (as signified at Table 1 by the comment "yes"). The drop test is conducted on an off-line sample of film immediately after irradiation, and on a sample which has been stored for one week at room temperature.

Several other samples are taken from the cured microporous film roll and tested for electrical resistance in the manner described herein after soaking in a 40%, by weight, aqueous solution of KOH maintained at 60° C. for one hour, 24 hours, 4 days and 8 days respectively and the results averaged. The soaking of the film sample in hot KOH for progressively longer times simulates aging over long periods of time.

The surface area of each sample tested for electrical resistance is 0.2 in$^2$, and the current employed is 40 milliamperes direct current.

Three samples of the cured microporous film roll are tested for air flow permeability in accordance with Gurly test ASTM-D-726B.

The results are summarized in chart form in Table I.

Samples of the cured microporous film roll are also tested for water flow after soaking in a 31% aqueous solution of KOH maintained at 60° C. for 24 hours by placing each sample having a surface area of 11.3 cm² in a millipore filter housing. The millipore filter is filled with water and pressurized to an atmosphere differential between both surfaces of the film sample. Water is collected as it passes through the microporous film over a 5 minute period. The results are converted to cc's of water collected per minute per cm² of film surface.

The results are summarized in Table I.

COMPARATIVE EXAMPLE

Example 1 is repeated with the exception that the radiation dose employed for curing is reduced to 1 megarad. The results are summarized at Table 1. An uncoated microporous film prepared in accordance with Example 1 is also exposed to ionizing radiation and tested in the same manner as described in Example 1 and serves as a Control. The results are summarized at Table 1.

As may be seen from the data of Table I, a 1 megarad dose is believed to be too small to achieve effective curing of a polypropylene microporous film as indicated by the infinite electrical resistance of the microporous film of the comparative Example. The positive wettability test of the Comparative Example on the off line sample is believed to be due to residual acrylic acid which has not been chemically fixed by the irradiation. The negative wettability of the film of this Comparative Example after one week is believed to be due to loss of the acrylic acid over the storage period of one week. This is confirmed by the infinite electrical resistance of the film after 1 week storage.

It can also be seen that the electrical resistance of the film of Example 1 increases after 4 days of exposure to hot KOH and then drops slightly after 8 days of exposure. It is believed that the drop after 8 days of aging may be due to the complete conversion of the acrylic graft to its salt form while after 4 days of aging the salt conversion is only partially completed. Thus, complete conversion of the acrylic graft to its salt form appears to lower electrical resistance.

TABLE I

|  | Example 1 | Comparative Example | Control |
|---|---|---|---|
| Dose (megarads) | 3 | 1 | 3 |
| Line speed (ft/min) | 30 | 20 | 30 |
| Wettability (drop test) | | | |
| Off line | yes | yes | ND |
| after 1 week | yes | no | ND |
| Electrical resistance (milliohms/in²) | | | |
| 1 hour | 5.00 | ∞ | ∞ |
| 24 hours | 6.87 | ∞ | |
| 4 days | 10.6 | ∞ | |
| 8 days | 7.1 | ∞ | |
| Gurley (air) (Gurley-seconds) | 9.1 | ND | 10 |
| Water flow (cc/min/cm²) | 0.35 | 0 | ND |

ND = Not Determined

EXAMPLE 2
PART A

This discussion illustrates the preparation of a polyethylene microporous film by the "solvent stretch" method.

Crystalline polyethylene having a melt index of 5.0; a weight average molecular weight of about 80,000, a density of 0.960 gm/cc, and a molecular weight distribution ratio of about 9.0 is prepared by the blown film extrusion method to form a precursor film (3 mils thick) and allowed to cool by quenching in air at 25° C. A sample of the resulting precursor film is then immersed for a period of 1 minute in trichloroethylene at 70° C. and subsequently stretched, while immersed in trichloroethylene maintained at a temperature of 70° C., at a strain rate of 150%/min. to 4 times its initial length (i.e., 300% total stretch). The trichloroethylene is then removed by evaporation and the sample is stretched in the cross machine direction to a degree of stretch of about 50% and allowed to dry in air in the stretched state. Drying is carried out at 25° C.

The resulting microporous film exhibits a crystallinity of about 60%, an average pore length of about 5000 Angstroms, and a surface area between about 10 and about 25 sq. m/gm.

PART B

Several microporous film samples 1 mil in thickness prepared in accordance with Part A are dipped in glacial acrylic acid (100%) and the film becomes translucent. The samples are permitted to dry until the film takes on a white opaque appearance which appearance is indicative of the appropriate amount of monomer coating capable of achieving an add-on of about 1.5%. The resulting samples are then passed beneath an elongated electron beam curtain (i.e. 24 inches length) and irradiated with varying doses of radiation while maintaining the atmosphere under the window and in contact with the microporous film at less than 500 ppm of oxygen in the manner employed in Example 1. The resulting cured films are tested for Gurly air flow, electrical resistance (after submersion for 24 hours in a 40% KOH solution at 60° C.) and wettability by the drop test in the manner described in Example 1. The results are summarized at Table II as runs 1 to 8. The percent add-on of resulting cured film samples is also determined by infrared analysis and the results shown at Table II.

As may be seen from the results of Table I runs 4 and 7, the electrical resistance is infinite and the samples fail to wet. These results are believed to be attributable to the use of too low a radiation dosage to achieve chemical fixation. Consequently, it is believed that the hydrophilic monomer evaporates as evidenced by the lack of any measurable add-on with a resultant loss of properties.

The film samples of runs 1, 2, 5, 6, and 8 exhibit low electrical resistance and are wettable. The higher electrical resistance of the film sample of run 3 is believed to be due to a visually observed inhomogeneity in the film. Moreover, these film samples wherein chemical fixation occurs, as indicated by a 1.5% add-on, exhibit only a slight drop in air permeability. This indicates that the pores remain unplugged after chemical fixation.

TABLE 2

| Run No. | Add-on acrylic acid determined after radiation % | Radiation dose (megarads) | Electrical Resistance (milliohms-in²) | Gurley (ASTM-D-726) Before | Gurley (ASTM-D-726) After | Wetted drop test |
| --- | --- | --- | --- | --- | --- | --- |
| 1 | 1.5 | 3 | 8.5 | 0.4 | 0.6 | yes |
| 2 | 1.5 | 1 | 7.0 | 0.4 | 0.46 | yes |
| 3 | 1.5 | 3 | 364* | 0.38 | 0.80 | yes |
| 4 | 0 | ½ |  | 0.35 | 0.34 | no |
| 5 | 1.5 | 3 | 10.0 | 0.40 | 0.68 | yes |
| 6 | 1.5 | 1 | 4.5 | 0.40 | 0.76 | yes |
| 7 | 0 | ½ |  | 0.40 | 0.48 | no |
| 8 | 1.5 | 1 | 13.0 | 0.35 | 0.76 | yes |

*high electrical resistance is believed due to an inhomogeneity in the film.

The principles, preferred embodiments and modes of operation of the present invention have been described in the foregoing specification. The invention which is intended to be protected herein, however, is not to be construed as limited to the particular forms disclosed. Variations and changes may be made by those skilled in the art without departing from the spirit of the present invention.

What is claimed is:

1. A process for preparing an open celled hydrophilic polyolefinic microporous film having an electrical resistance of less than about 30 milliohms per square inch and a water flow rate therethrough of greater than about 0.01 cc/min/cm² at a pressure differential of about one atmosphere from a normally hydrophobic polyolefinic microporous film selected from the group consisting of polyethylene and polypropylene microporous films, comprising the steps of:
   (a) coating the surface of the micropores of a normally hydrophobic polyethylene or polypropylene open celled microporous film characterized by having a reduced bulk density as compared to the bulk density of a precursor film from which it is prepared, an average pore size of from about 200 to about 10,000 Angstroms, and a surface area of at least about 10 square meters per gram, with at least one hydrophilic organic hydrocarbon monomer having from about 2 to about 18 carbon atoms characterized by the presence of at least one double bond and at least one polar functional group; and
   (b) chemically fixing to the surface of the micropores of the microporous film an amount of said hydrophilic organic hydrocarbon monomer sufficient to preserve the open celled nature of said micropores and sufficient to obtain an add-on of from about 0.1 to about 10%, by weight, based on the weight of the uncoated microporous film, by irradiating the coated microporous film of (a) with an amount of ionizing radiation of from about 1 to 10 megarads for polyethylene microporous films and from about 3 to 10 megarads for polypropylene films.

2. The process of claim 1 wherein the hydrophilic organic hydrocarbon monomer has from about 2 to about 14 carbon atoms and at least one polar function group selected from the group consisting of carboxyl, sulfo, sulfino hydroxyl, ammonio, amino and phosphono.

3. The process of claim 1 wherein the hydrophilic organic hydrocarbon monomer is selected from the group consisting of unsubstituted and alkyl substituted acrylic acids, vinyl esters, vinyl ethers and mixtures thereof.

4. The process of claim 1 wherein the hydrophilic organic hydrocarbon monomer is selected form the group consisting of acrylic acid, methacrylic acid, vinyl acetate and mixtures thereof.

5. The process of claim 1 wherein the normally hydrophobic microporous film is provided from polymers selected from the group consisting of polyethylene, and polypropylene and is prepared by the "solvent stretch" or "dry stretch" method.

6. The process of claim 1 wherein the surface of the micropores of the normally hydrophobic microporous film is chemically fixed with an add-on of hydrophilic organic hydrocarbon monomer of from about 0.5 to about 2.5% by weight, based on the weight of the uncoated film.

7. A process for preparing an open celled hydrophilic polyolefinic microporous film having an electrical resistance of less than about 30 milliohms per square inch and a water flow rate therethrough of greater than about 0.01 cc/min/cm² at a pressure differential of about one atmosphere from a normally hydrophobic polyolefinic microporous film selected from the group consisting of polyethylene and polyproplyene microporous films, comprising the steps of:
   (a) coating the surface of the micropores of an open celled normally hydrophobic microporous film prepared from polymers selected from the group consisting of polyethylene and polypropylene, said film being characterized by having a reduced bulk density as compared to the bulk density of a precursor film from which it is prepared, a crystallinity of greater than about 30%, an average pore size of from about 400 to about 5000 Angstroms, and a surface area of at least about 10 square meters per gram, with at least one hydrophilic organic hydrocarbon monomer selected from the group consisting of acrylic acid, methacrylic acid, vinyl acetate; and
   (b) chemically fixing to the surface of the micropores of the microporous film an amount of said hydrophilic monomer sufficient to preserve the open celled nature of said micropores and sufficient to obtain an add-on of from about 0.5 to about 2.5% by weight, based on the weight of the uncoated microporous film, by irradiating the coated microporous film of (a) with an amount of ionizing radiation of from about 1 to about 10 megarads for polyethylene microporous films and from about 3 to about 10 megarads for polypropylene films.

8. A hydrophilic open celled microporous film having an electrical resistance of less than about 30 milliohms per square inch and a water flow rate therethrough of greater than about 0.01 cc/min/cm² at a pressure differential of about one atmosphere comprising:

(a) an open celled normally hydrophobic microporous film prepared from a polymer selected from the group consisting of polyethylene and polypropylene characterized by having a reduced bulk density as compared to the bulk density of a precursor film from which it is prepared, an average pore size of from about 200 to about 10,000 Angstroms and a surface area of at least 10 square meters per gram; and (b) a coating on the surface of the micropores of the microporous film of at least one hydrophilic organic hydrocarbon monomer having from about 2 to about 18 carbon atoms characterized by the presence of at least one double bond and at least one polar function group in an amount sufficient to preserve the open celled nature of the microporous film and to obtain an add-on of from about 0.1 to about 10%, by weight, based on the weight of the uncoated microporous film, said hydrophilic organic hydrocarbon monomer coating being chemically fixed to the surface of the micropores of the microporous film by exposure to an amount of ionizing radiation of from about 1 to 10 megarads for polyethylene microporous films and from about 3 to 10 megarads for polypropylene microporous films.

9. The hydrophilic microporous film of claim 8 wherein the hydrophilic organic hydrocarbon monomer has from about 2 to about 14 carbon atoms and at least one polar functional group selected from the group consisting of carboxyl, sulfo, sulfino, hydroxyl, ammonio, amino, and phosphono.

10. The hydrophilic microporous film of claim 8 wherein the hydrophilic organic hydrocarbon monomer is selected from the group consisting of unsubstituted and alkyl substituted acrylic acids, vinyl esters and mixtures thereof.

11. The hydrophilic microporous film of claim 8 wherein the hydrophilic organic hydrocarbon monomer is selected from the group consisting of acrylic acid, methacrylic acid, vinyl acetate and mixtures thereof.

12. The hydrophilic microporous film of claim 8 wherein the normally hydrophobic polymeric microporous film is selected from the group consisting of polypropylene and polyethylene and is prepared by the "solvent stretch" or "dry stretch" method.

13. The hydrophilic microporous film of claim 8 wherein the hydrophilic monomer is chemically fixed on the surface of the micrporoes at an add-on of from about 0.5 to about 2.5% by weight, based on the weight of the uncoated microporous film.

14. A hydrophilic open celled microporous film having an electrical resistance of less than about 30 milliohms per square inch and a waterflow rate therethrough of greater than about 0.01 cc/min/cm$^2$ at a pressure differential of about one atmosphere comprising:

(a) a normally hydrophobic open celled microporous film prepared by the "solvent stretch" or "dry stretch" method from polymers selected from the group consisting of polyethylene and polypropylene, said film being characterizied by having a reduced bulk density as compared to the bulk density of a precursor film from which it is prepared, a crystallinity of at least 30%, an average pore size of from about 400 to about 5,000 Angstroms, and a surface area of at least about 10 square meters per gram; and (b) a coating on the micropore surface of the microporous film of at least one hydrophilic organic hydrocarbon monomer having from about 2 to about 18 carbon atoms selected from the group consisting of unsubstituted and alkyl substituted acrylic acids, vinyl esters, and mixtures thereof in an amount sufficient to preserve the open celled nature of the micropores of the microporous film and to obtain an add-on of from about 0.5 to about 2.5% by weight, based on the weight of the uncoated microporous film, said hydrophilic organic hydrocarbon monomer coating being chemically fixed to the surface of the micropores by exposure to an amount of ionizing radiation of about 1 to 10 megarads of polyethylene microporous films and from about 3 to 10 megarads for polypropylene microporous films.

15. The hydrophilic microporous film of claim 14 wherein the hydrophilic monomer is selected from the group consisting of acrylic acid, methacrylic acid, vinyl acetate and mixtures thereof.

* * * * *